May 21, 1935. E. L. CARLSON 2,001,772
ALTERNATING CURRENT MOTOR AND THE LIKE
Filed Dec. 19, 1933
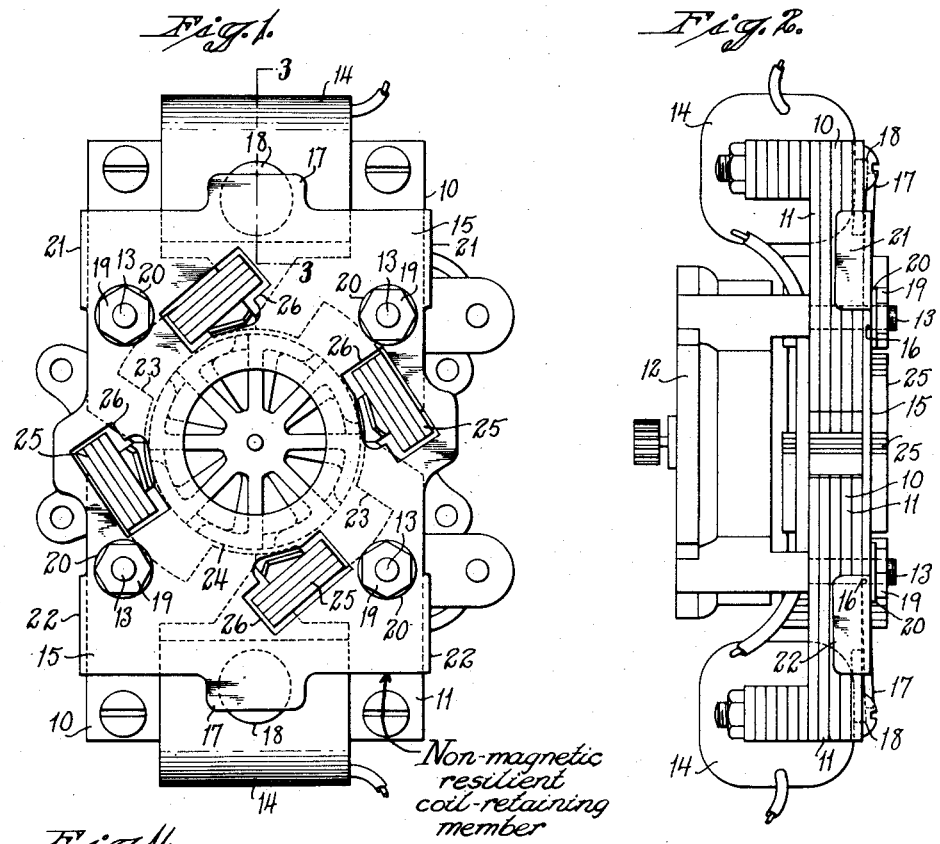
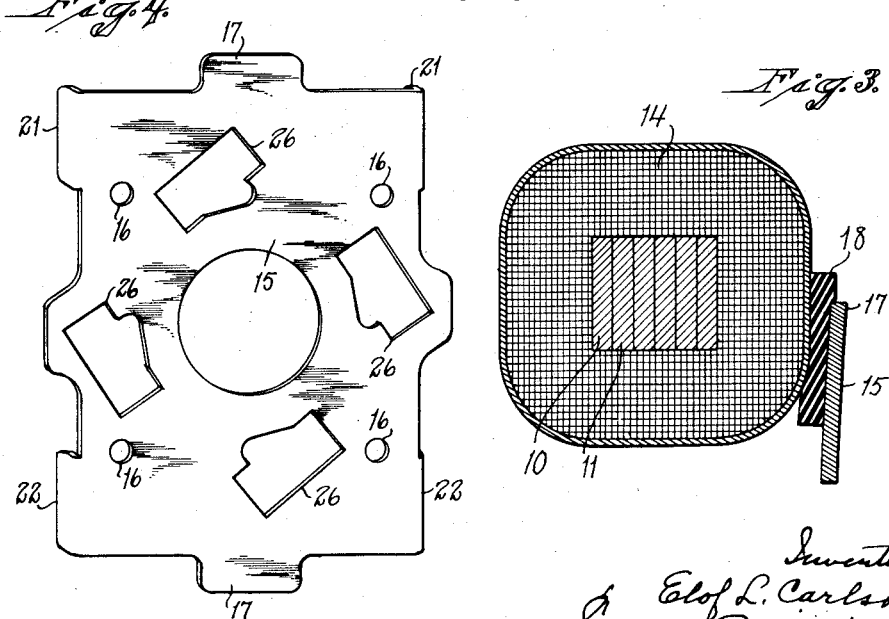

Patented May 21, 1935

2,001,772

UNITED STATES PATENT OFFICE 2,001,772

ALTERNATING CURRENT MOTOR AND THE LIKE

Elof L. Carlson, Bristol, Conn., assignor to The E. Ingraham Company, Bristol, Conn., a corporation Application December 19, 1933, Serial No. 703,031

5 Claims. (Cl. 172—275)

This invention relates to improvement in electric motors and particularly to alternating-current electric motors and other motors operable by a pulsating current supply.

Miniature alternating-current motors are now extensively used in clocks and other instruments, and considerable time and expense have been spent in efforts to minimize the so-called "alternating-current hum," but with more or less in different success.

One of the main objects of the present invention is to provide reliable and effective means for minimizing the hum or other noise in the field- or stator-structures of electric motors and particularly synchronous motors.

Other objects and advantages will appear to those skilled in the art from the following, taken in connection with the accompanying drawing and the appended claims.

In the accompanying drawing:

Fig. 1 is a face view of a synchronous electric motor embodying one form of the present invention;

Fig. 2 is a view thereof in edge elevation;

Fig. 3 is a broken detail sectional view taken on the line 3—3 of Fig. 1 but on a larger scale; and Fig. 4 is a perspective view of the dampening-plate detached.

The synchronous electric motor herein chosen for the illustration of the present invention is provided with a laminated field- or stator-structure generally designated by the numeral 10 and composed of layers 11 of iron or other suitable magnetic material. The said stator-structure is suitably mounted in the instance shown upon a gear-box 12 by means of four (more or less) threaded pillars 13 which extend from front to rear through the series of laminations forming the main- or body-portion of the stator-structure, as clearly indicated in Figs. 1 and 2.

The field-structure shown also includes an energizing- or electromagnet-coil 14 at each of its respective opposite ends, and through the respective hollows centers of which portions of the stator-structure extend to form magnetic cores.

Placed directly against the rearmost lamination 11 is a dampening-plate generally designated by the numeral 15 and preferably formed of resilient but non-magnetic material such as brass and formed with four (more or less) perforations 16 suitably spaced to respectively fit over the rear ends of the pillars 13 before referred to.

The dampening-plate 15 is as shown provided at each of its respective opposite ends with an off-setting spring-finger 17, each of which projects over the adjacent one of the coils 14 so as to exert pressure thereon. To guard against the possible abrasion of the delicate wiring of the coils 14, a pad 18 of rubber, fiber, leather, or other suitable material, is interposed between each of the said spring-fingers 17 and the particular one of the coils 14 which it overlies.

The dampening-plate 15 after its installation over the projecting rear ends of the pillars 13 is clamped tightly in place by nuts 19, one of which is applied to the threaded rear end of each of the said pillars 13 after a washer 20 (preferably of fiber or the like) has been first installed on each of the said pillars.

The dampening-plate 15 is also provided on each of its respective opposite side edges with a pair of forwardly-offsetting fingers 21—22 which embrace, so to speak, the respective opposite sides of the stator-structure and assist in stabilizing the same against accidental displacement and electromagnetic vibration.

The stator-structure 10 is also provided with a plurality of polar-projections 23 projecting inwardly adjacent the periphery of a rotor 24 in a manner usual in electric motors, and certain of the said polar-projections are provided with so-called "shading" or "short-circuiting" coils 25 acting to provide a rotating magnetic field for the rotor 24. As will be noted by reference in particular to Fig. 1, the dampening-plate 15 is preferably provided with a sufficient number of clearance-openings 26 through which the shading or short-circuiting coils 25 may project.

When attached to the stator-structure as shown, the dampening-plate 15 or equivalent member serves to stabilize the coils 14 with respect to the magnetic laminations 11 and effectively prevents such movement between the coil and the said laminations as would occasion an appreciable audible hum. In this connection, it may be stated that when the coils 14 are energized by an alternating or other fluctuating current, a magnetic reaction takes place between the portions of the stator-structure extending through the coils and the coils themselves of such nature as tends to shift the said parts with respect to each other upon each pulsation in the current. Similar magnetic reactions will occur between the individual laminations 11 of the stator-structure, but the same will be materially suppressed by the dampening-plate 15.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. In an alternating-current motor, the combination with the rotor thereof; of a stator-structure having polar-projections extending laterally toward the said rotor, an electromagnet-coil located laterally to one side of the said rotor and a magnetic core extending through the said coil; and a vibration-dampener of non-magnetic material and connected to the stator-structure independently of the said core and extending in a direction substantially perpendicular to the axis of the said rotor and constructed and arranged to engage the exterior of the said coil and press the latter transversely into engagement with the said core to stabilize the same against relative vibration with respect to each other and with respect to the said polar-projections, under the influence of alternating magnetic flux.

2. In an alternating-current motor, the combination with the rotor thereof; of a stator-structure having polar-projections extending laterally toward the said rotor, an electromagnet-coil located laterally to one side of the said rotor and a magnetic core extending through the said coil; and a resilient plate-like vibration-dampener of non-magnetic material and connected to the stator-structure independently of the said core and extending in a direction substantially perpendicular to the axis of the said rotor and constructed and arranged to engage the exterior of the said coil and press the latter transversely into engagement with the said core to stabilize the same against relative vibration with respect to each other and with respect to the said polar-projections, under the influence of alternating magnetic flux.

3. In an alternating-current motor, the combination with the rotor thereof; of a stator-structure having two electromagnet-coils located on opposite sides of the said rotor and a magnetic core extending through each of the said coils; and a vibration-dampener of non-magnetic material extending in a direction substantially perpendicular to the axis of the said rotor and acting to press both of the said oppositely-located coils against their respective cores.

4. In an alternating-current motor, the combination with the rotor thereof; of a stator-structure having two electromagnet-coils located on opposite sides of the said rotor and a magnetic core extending through each of the said coils; and a resilient plate-like vibration-dampener of non-magnetic material extending in a direction substantially perpendicular to the axis of the said rotor and acting to press both of the said oppositely-located coils against their respective cores.

5. In an alternating-current motor, the combination with the rotor thereof; of a stator-structure having two electromagnet-coils located on opposite sides of the said rotor and a pole-member of magnetic material for each of the said coils; and stabilizing-means of non-magnetic material extending between the pole-members of the respective coils and pressing against both of said coils to stabilize the same.

ELOF L. CARLSON.